United States Patent Office 3,035,939
Patented May 22, 1962

3,035,939
PRIMER COMPOSITION AND METAL BASE COATED THEREWITH
Hugh Edwards, Chicago, Ill., assignor to Bradley & Vrooman Company, a corporation of Illinois
No Drawing. Filed June 17, 1959, Ser. No. 820,879
18 Claims. (Cl. 117—75)

The present invention relates to primer compositions and more particularly to primers which are useful for bonding vinyl resin plastisols and organosols to a metal base.

As is well known, vinyl resin plastisols and organosols are not satisfactorily adherent to various smooth surfaces such as metal surfaces, this lack of satisfactory adhesion being particularly noticeable when the coated base is fabricated to draw and shape the coated base. Various primers are known to the art for improving the adhesion of vinyl resin plastisols and organosols, but all of the prior primers which have been applied to this use have proven inadequate when the coated base was subjected to substantial deformation, particularly when the coated base was extensively drawn or sharply deformed or bent.

In accordance with the invention, a primer composition is provided which comprises a mixture of resin components dissolved in an organic solvent. The resin components comprise an hydroxyl-containing polyepoxide, a vinyl component containing free carboxyl radicals, a polyisocyanate component and a methyl methacrylate polymer, these components interacting upon baking to provide a film which is strongly adherent to the metal base upon which it is applied and which bonds strongly to a superposed coating or top-coat of vinyl resin plastisol or organosol.

Referring more particularly to the primer compositions of the invention, the primer includes an hydroxyl-containing polyepoxide in an amount sufficient to supply from 0.03–0.055 mol of hydroxyl radical per 100 parts of total resin solids, the polyepoxide preferably containing at least 0.045 hydroxyl equivalents per 100 grams of polyepoxide. For each molecular equivalent of hydroxyl radical supplied by the polyepoxide, there is present in the mixture of dissolved resin components: (1) a polyisocyanate in an amount to provide from 0.5–1.0 mol of isocyanate radical; (2) a solvent-soluble carboxyl-containing vinyl resin component containing from 0.1–3.0% by weight of free carboxyl radical to provide in the primer composition from 0.05–0.08 mol, preferably from 0.057–0.067 mol, of free carboxyl radical; and (3) a methyl methacrylate polymer containing at least 75% by weight of polymerized methyl methacrylate monomer with any balance of the polymer being polymerized monovinylidene monomer which is preferably free of functional groups reactive with the oxirane group of the polyepoxide, said methyl methacrylate polymer being present in an amount to provide a weight ratio of said vinyl resin component to methyl methacrylate polymer of from 0.7:1.0 to 1.1:1.0.

The polyepoxide resins which may be used in accordance with the invention are those containing hydroxyl functionality, as aforesaid, and which preferably have a 1,2 epoxy equivalency greater than 1.4. The polyepoxide may be either aliphatic or aromatic. Preferred polyepoxides have a 1,2 epoxy equivalency of about 2.0 and are glycidyl polyethers of polyhydric organic compounds. It is particularly preferred to employ normally liquid glycidyl polyethers, especially those which are polyglycidyl ethers of dihydric aromatic compounds and particularly bisphenols such as bisphenol A. The use of polyepoxides which are liquid at room temperature facilitates the provision of primer compositions containing a maximum proportion of resin solids. It is feasible to employ polyepoxides having a molecular weight of up to about 6000, although polyepoxides having a molecular weight of from 300 to 600 are preferred.

A large number of known polyglycidyl ethers of polyhydric aliphatic or aromatic compounds may be used in the invention. Various of these are described in United States Patent 2,801,229 which illustrates the production of suitable aliphatic and aromatic polyglycidyl ethers.

A particularly preferred liquid polyepoxide resin for use in the invention is the reaction product of bisphenol A and epichlorohydrin having a molecular weight of 390, an epoxy value of 0.54 equivalent per 100 grams of resin and an hydroxyl value of 0.08 equivalent per 100 grams of resin. This liquid polyepoxide resin is referred to as polyepoxide resin "A" and is preferably employed in an amount of from 40–67% by weight based on the total weight of resin solids contained in the primer composition.

Any polyisocyanate may be used in accordance with the invention such as tolylene diisocyanate (pure or mixed isomers), hexamethylene diisocyanate, 1,5 naphthalene diisocyanate, methylene bis-4-phenyl isocyanate, etc.

It is preferred in accordance with the invention to employ a polyisocyanate which generates the isocyanate reactive groups during the baking operation, such products being known to the art as "hindered isocyanates" or "isocyanate generators." A particularly preferred isocyanate generator is an adduct of the selected polyisocyanate with phenol, these adducts being stable at room temperature but generating polyisocyanate upon heating, e.g., to temperatures of 140–160° C.

A particularly preferred isocyanate generator is the reaction product of 4,4',4"-triphenyl methane triisocyanate with 2-ethyl-2-hydroxylmethyl-1,3-propanediol in amounts providing a ratio of isocyanate to hydroxyl of 2:1, this reaction product being blocked or hindered by reaction of one mol of the reaction product with three mols of phenol to provide as isocyanate generator which is a solid containing about 12% available isocyanate radical and which generates isocyanate reactivity when heated to temperatures in the range of 140–150° C. This specific polyisocyanate will be referred to as polyisocyanate "A."

Various other adducts which will generate isocyanate reactivity upon subjection to elevated temperatures are adducts of polyisocyanates with malonic esters. Still other polyisocyanate generators are illustrated by dimers of 2,4-tolylene diisocyanate which can be formed by the influence of either pyridine or triethyl phosphine and which liberate polyisocyanate when heated to temperatures of about 150° C.

The important point to be observed with respect to the utilization of an isocyanate generator is the fact that polyisocyanate is not generated in the system until the primer composition is baked. Thus, the primer compositions of the invention may be formulated to provide a single-package stable system. On the other hand, a reactive polyisocyanate component may be used instead of an isocyanate generator if the primer composition is to be applied immediately after its components are mixed together.

The caboxyl-containing vinyl resins used in the invention are solvent-soluble copolymers preferably having a molecular weight in the range of from 8000 to 20,000 and constituted by from 60 to 90% by weight of vinyl halide (preferably vinyl chloride) polymerized with a vinyl fatty acid ester (preferably vinyl acetate) comprising the major portion of the balance of the copolymer. In place of vinyl acetate, other vinyl esters preferably lower alkyl esters such as vinyl propionate, dibutyl maleate and vinyl butyrate may be used. All or a portion of the vinyl copolymers include not more than 5% by weight of free carboxyl radical supplied by carboxylic monomer selected from the group consisting of aliphatic, alpha, beta-monoethylenically unsaturated carboxylic acids, anhydrides of said acids and partial alkyl esters of said acids. The carboxylic monomer should be present in the vinyl copolymer or mixture of vinyl copolymers in an amount sufficient to provide from 0.1–3.0% by weight of free carboxyl radical in the vinyl resin component.

The carboxylic monomer is preferably maleic acid. Maleic anhydride, acrylic acid, methacrylic acid, crotonic acid, monobutyl maleate, and monopropyl itaconate are representative of other unsaturated carboxylic monomers which can be used to provide in the copolymers which are formed free carboxyl radical or, its equivalent, the acid anhydride group.

A particularly preferred carboxyl-containing vinyl resin component is provided by copolymerizing 86 parts by weight of vinyl chloride, 13 parts by weight of vinyl acetate and 1 part by weight of maleic acid to provide a copolymer having a molecular weight of about 18,000. This polymer is referred to as carboxyl-containing vinyl polymer "A."

The primer compositions of the invention include a proportion of methyl methacrylate polymer. The preferred polymers consist substantially of polymerized methyl methacrylate monomer. However, the invention includes the utilization of methyl methacrylate copolymers containing up to about 25% by weight of copolymerized monomer containing a monovinylidene radical and which is preferably free of functional groups reactive with the oxirane group of the polyepoxide. Various esters of either acrylic or methacrylic acids such as alkyl and alkoxy alkyl acrylates and methacrylates illustrated by ethyl methacrylate and methyl acrylate may be used to form the minor portion of the copolymer. Aromatic monovinylidene compounds such as styrene, and various other copolymerizable monovinylidene monomers such as acrylonitrile, methacrylonitrile and acrylamide may also be used.

The invention optionally includes the use of up to 30% by weight, based on the weight of carboxyl-containing vinyl resin component, of solvent-soluble vinyl alcohol-containing vinyl resin. Preferred vinyl resins containing vinyl alcohol are copolymers having a molecular weight of from 8000 to 20,000 and containing from 60–92% by weight of vinyl halide (preferably vinyl chloride) with the balance of the copolymer being constituted by vinyl fatty acid ester (preferably vinyl acetate) with a portion of the ester group being converted by hydrolysis or saponification to vinyl alcohol providing a copolymer containing from 2% to 10% by weight of vinyl alcohol.

The utilization of vinyl alcohol-containing vinyl resins in primer compositions in accordance with the invention is particularly beneficial in providing pigmented primers. A preferred vinyl alcohol-containing vinyl resin is provided by copolymerizing vinyl chloride and vinyl acetate in weight proportions of 87:13 to provide a copolymer having a molecular weight of about 18,000 which is then saponified in acid medium to provide a vinyl alcohol content of 6% by weight. This vinyl alcohol-containing copolymer is referred to as hydroxyl-containing vinyl resin "A" and may desirably be used in an amount of about 20% by weight based on the carboxyl-containing vinyl resin component.

The primers of the invention are particularly useful for application to metal bases such as iron or steel. The iron or steel surface may be treated with acid, e.g., phosphoric acid, or galvanized. The metal is desirably in the form of a sheet as illustrated by a sheet of carbon steel, tinplate or backplate, but steel, iron or other metal members of any form may be used, e.g., bars, rods, pipes, printing roll cores, tubes, etc. Aluminum may be coated in accordance with the invention and the aluminum surface may, if desired, be previously treated to provide the surface thereof with an amorphous phosphate or chromate protective covering. Glass may also be coated in accordance with the invention.

Any of the conventional vinyl plastisols and organosols using vinyl chloride homopolymers or copolymers of vinyl chloride with minor proportions of vinyl acetate or vinylidene chloride may be utilized in the present invention. The invention is particularly directed to plastisols containing polymers and copolymers comprising at least 90% by weight of vinyl chloride and having a molecular weight above 20,000 so as to possess only limited solubility in organic solvents. Thus, polyvinyl chloride per se may be employed as well as copolymers of vinyl chloride containing up to 10% by weight of either vinyl acetate or vinylidene chloride. Exemplary vinyl resins for use in plastisols and organosols for the formulation of top-coats in accordance with the present invention are those sold under the trade designations Geon 121, Opalon 410 and Vinylite QYNV. Rereference is made to the B. F. Goodrich Chemical Company service bulletin No. BR-3 dated June 1954, which contains a large number of examples of suitable dispersion resins and illustrates their application and baking.

As is conventional, the plastisols and organosols may be pigmented and may include fillers as well as various plasticizers and stabilizers without detracting from the superior adhesion which is achieved utilizing the primer compositions of the invention. Suitable weight ratios of dispersion resins to plasticizer are from 30/70 to 72/28. In organosols a higher ratio of dispersion resin to plasticizer up to about 95/5 may be used.

The primer compositions of the invention are applied to the base from solvent solution medium. Preferred solvents are active solvents for vinyl resins, particularly oxygen containing solvents such as: ketones, illustrated by acetone, methyl ethyl ketone, methyl isobutyl ketone, cyclohexanone, isophorone and diacetone alcohols; esters, illustrated by ethyl acetate, n-butyl acetate, isobutyl acetate and butyl propionate; cyclic oxygen compounds, illustrated by tetrahydrofuran, tetrahydropyran, dioxane and propylene carbonate; ether alcohols and esters thereof, illustrated by Cellosolve and Cellosolve acetate; nitrated organic compounds illustrated by 2-nitro propane and nitrobenzene; amides such as dimethyl formamide; and nitriles illustrated by acetonitrile.

The foregoing active solvents may be extended with various diluents such as benzene, toluene, xylene, ethyl benzene and mixtures thereof including commercial mixtures which may contain minor proportions of aliphatic hydrocarbons. Small proportions of mineral spirits and other aliphatic diluents may also be employed. In commercial formulations, the active solvents are normally employed in admixture with one another and together with a maximum proportion of diluent consistent with solubility as is known to the art.

The primer compositions are applied to the base in any convenient manner as by spraying, roller coating, brushing, etc., and application is preferably effected to apply, preferably in a single film, a sufficient weight of the primer to provide dry film thickness of from 0.1–0.3 mil although thicker and thinner films are also usable. The film is cured by baking at temperatures above 300° F. in order to volatilize the solvents contained in the primer and to cause the resin components of the primer to react with one another to provide a thermosetting cure. The precise time and temperature of cure is easily determined. Preferred compositions can be satisfactorily cured by baking for ten minutes at 375° F., five minutes at 400° F., one minute at 500° F., or one-half minute at a temperature of from 550–575° F.

During the curing reaction, the various polymer components solidify as the solvent portion of the primer is removed and the polyepoxide, the polyisocyanate and the carboxyl-containing vinyl resin interact with one another to provide a thremoset matrix including the methyl methacrylate polymer component.

*Example I*

The following components were mixed together to provide a preferred primer formulation in accordance with the invention, all parts being by weight.

| Component: | Parts |
|---|---|
| Polyepoxide resin "A" | 650 |
| Polyisocyanate "A" | 140 |
| Polymethyl methacrylate (40% solution in methyl ethyl ketone) | 560 |
| Carboxyl-containing vinyl resin "A" | 190 |
| Cellosolve acetate | 750 |
| Methyl isobutyl ketone | 500 |
| Hydrocarbon diluent | 100 |

*Example II*

The primer formulation of Example I was applied to sheets of 22 gauge cold rolled carbon steel and baked for five minutes at 400° F. to provide dry film thicknesses of from 0.1–0.3 mil and the sheets of primed steel were then roll coated with vinyl resin plastisol and baked for 18 minutes at 350° F. to fuse the coating to the primed base. The plastisol employed contained 100 pounds polyvinyl chloride resin in the form of a stir-in dispersion in 80 pounds of disobutyl phthalate containing one pound of dibutyl tin maleate.

Adhesion was tested by extending the strip 30% and then scratching the coating with a knife to provide a free edge which can be grabbed and pulled. Adhesion is noted by the extent of separation of the coated film from either the base or the primer. Zero adhesion is represented by complete removal of either the topcoat or the topcoat together with the primer as a continuous film none of which remains adhered to the underlying steel substrate. On the other hand, perfect adhesion represents a complete inability to separate the coated film from either the steel substrate or the layer of primer. Applying this test to the coated product of the present example, adhesion was perfect.

*Example III*

Example I was repeated using in place of the polyvinyl chloride dispersion resin-containing plastisol of Example I a similar plastisol containing a corresponding weight of a copolymer of 90% vinyl chloride with 10% vinylidene chloride, the dispersion resin being again of the stir-in type. The results obtained were identical with those reported in Example I, the perfect adhesion of the primer to the base and also of the topcoat to the primer being achieved as indicated by the scratch-pull test following extension of the coated strip to an extent of 30%.

It is desired to point out that the polyisocyanate component is essential to the achievement of adhesion retention following extensive drawing of the coated base as in Examples I and II. Thus, upon repeating Examples I and II, eliminating the polyisocyanate component, satisfactory adhesion was produced prior to drawing but after drawing there was a complete failure of adhesion.

Interestingly, the use of polyepoxide together with methyl methacrylate polymer as a primer for adhering plastisol and organosol topcoats is known. However, these primer compositions, in order to produce reliable results, require the utilization of an amine curing agent which leads to discoloration of the primer upon baking. The use of amine curing agents is rendered unnecessary in the invention enabling clear primers to be applied without discoloration and it also facilitates the application of pigmented primers such as white-pigmented primers without the development of a yellow or brownish off-color during baking. Moreover, the utilization of polyepoxide and methyl methacrylate polymer in accordance with the art does not provide adequate retention of adhesion upon extensive drawing or sharp deformation of the coated base.

The primer compositions of the invention desirably include from 0.1–1.5 parts per part of total resin of metal oxide pigment such as titanium dioxide. Particularly when pigment is included, there is desirably further included in the primer of Example I, 20% by weight of vinyl alcohol-containing vinyl resin "A" based on the weight of carboxyl-containing vinyl resin "A" (an addition of 38 parts of vinyl alcohol-containing vinyl resin "A").

The primer compositions of the invention may be further modified in various ways known to the art as by the addition of fillers and extenders such as talc and in various other ways known to the art without departing from the invention as disclosed herein and as defined in the claims which follow.

I claim:

1. A primer composition comprising a mixture of resin components dissolved in an organic solvent, said mixture of resin components comprising an hydroxyl-containing polyepoxide present in an amount sufficient to supply from 0.03–0.055 mol of hydroxyl radical per 100 parts of total resin solids, said mixture of resins including for each molecular equivalent of hydroxyl radical supplied by said polyepoxide, (1) a polyisocyanate component in an amount to provide from 0.5–1.0 mol of isocyanate radical, (2) a solvent-soluble carboxyl-containing vinyl resin component providing from 0.05–0.07 mol of carboxyl radical, said vinyl resin component containing polymerized therein carboxylic monomer selected from the group consisting of aliphatic, alpha, beta-monoethylenically unsaturated carboxylic acids, anhydrides of said acids and partial alkyl esters of said acids, said carboxylic monomer providing said vinyl resin component with from 0.1–3.0% by weight of free carboxyl radical and (3) a methyl methacrylate polymer containing at least 75% by weight of polymerized methyl methacrylate with any balance of said polymer being polymerized monovinylidene monomer, said methyl methacrylate polymer being present in an amount to provide a weight ratio of said vinyl resin component to methyl methacrylate polymer of from 0.9:1.0 to 1.6:1.0.

2. A primer composition comprising a mixture of resin components dissolved in an organic solvent, said mixture of resin components comprising an hydroxyl-containing polyepoxide having an average molecular weight of from 300 to about 6000, an hydroxyl equivalency of at least 0.045 and a 1,2 epoxy equivalency of at least about 1.4, said polyepoxide being present in an amount sufficient to supply from 0.03–0.055 mol of hydroxyl radical per 100 parts of total resin solids, said mixture of resins including for each molecular equivalent of hydroxyl radical supplied by said polyepoxide, (1) a polyisocyanate component in an amount to provide from 0.5–1.0 mol of isocyanate radical, (2) a carboxyl-containing vinyl resin component providing from 0.05–0.08 mol of carboxyl radical, said vinyl resin component having a molecular weight in the range of 8,000 to 20,000 and comprising copolymers of from 60–90% by weight of vinyl halide with the major portion of the balance of the copolymers being vinyl fatty acid ester and at least a portion of said copolymers containing polymerized therein not more than 5% by weight of free carboxyl radical supplied by carboxylic monomer selected from the group consisting of aliphatic, alpha, beta-monoethylenically unsaturated carboxylic acids, anhydrides of said acids and partial alkyl esters of said acids, said carboxylic monomer providing said vinyl resin component with from 0.1–3.0% by weight of free carboxyl radical, and (3) a methyl methacrylate polymer containing at least 75% by weight of polymerized methyl methacrylate with any balance of said polymer being polymerized monovinylidene monomer free of functional groups reactive with the oxirane group of said polyepoxide, said methyl methacrylate polymer being present in an amount to provide a weight ratio of said vinyl resin component to methyl methacrylate polymer of from 0.7:1.0 to 1.1:1.0.

3. A primer composition as recited in claim 2 in which said vinyl resin component comprises copolymers of vinyl chloride and vinyl acetate.

4. A primer composition as recited in claim 3 in which said copolymers include about 1% by weight of copolymerized maleic acid and said vinyl resin component provides from 0.57–0.67 mol of carboxyl radical.

5. A primer composition as recited in claim 2 in which said polyepoxide is a polyglycidyl ether of a dihydric aromatic compound.

6. A primer composition as recited in claim 2 in which said polyepoxide is normally liquid.

7. A primer composition as recited in claim 2 in which said polyepoxide is the reaction product of bisphenol A and epichlorohydrin having a molecular weight of about 390, an epoxy value of about 0.54 and an hydroxyl value of about 0.08 and is present in an amount of from 40–67% by weight based on the total weight of resin solids.

8. A primer composition as recited in claim 2 in which said polyisocyanate component comprises an isocyanate generator which liberates isocyanate reactive groups upon heating.

9. A primer composition as recited in claim 8 in which said isocyanate generator is an adduct of a polyisocyanate with phenol.

10. A primer composition as recited in claim 9 in which said isocyanate generator is the reaction product of 4,4′,4″-triphenyl methane triisocyanate with 2-ethyl-2-hydroxymethyl-1,3-propanediol in amounts providing a ratio of isocyanate to hydroxyl of 2:1, this reaction product being blocked by reaction of one mol thereof with 3 mols of phenol.

11. A primer composition as recited in claim 2 in which said mixture of resin components includes up to about 30% by weight, based on the weight of said carboxyl-containing vinyl resin component, of a solvent-soluble vinyl alcohol-containing vinyl resin containing from 2–10% by weight of vinyl alcohol.

12. A primer composition as recited in claim 11 in which said vinyl alcohol-containing vinyl resin is a copolymer having a molecular weight of from 8,000 to 20,000 and comprises from 60–90% by weight of vinyl halide copolymerized with vinyl fatty acid ester, a portion of the said ester group being converted to vinyl alcohol.

13. A primer composition as recited in claim 12 in which said vinyl alcohol-containing copolymer is a copolymer of vinyl chloride and vinyl acetate.

14. A metal base having adhered thereto a baked primer film comprising the heat-reaction product of a mixture of resin components comprising an hydroxyl-containing polyepoxide present in an amount sufficient to supply from 0.03–0.055 mol of hydroxyl radical per 100 parts of total resin solids, said mixture of resins including for each molecular equivalent of hydroxyl radical supplied by said polyepoxide, (1) a polyisocyanate component in an amount to provide from 0.5–1.0 mol of isocyanate radical, (2) a solvent-soluble carboxyl-containing vinyl resin component providing from 0.05–0.07 mol of carboxyl radical, said vinyl resin component containing polymerized therein carboxylic monomer selected from the group consisting of aliphatic, alpha, beta-monoethylenically unsaturated carboxylic acids, anhydrides of said acids and partial alkyl esters of said acids, said carboxylic monomer providing said vinyl resin component with from 0.1–3.0% by weight of free carboxyl radical and (3) a methyl methacrylate polymer containing at least 75% by weight of polymerized methyl methacrylate with any balance of said polymer being polymerized monovinylidene monomer, said methyl methacrylate polymer being present in an amount to provide a weight ratio of said vinyl resin component to methyl methacrylate polymer of from 0.9:1.0 to 1.6:1.0.

15. A prime coated metal base as recited in claim 14 in which said metal base is a sheet of steel and said baked primer has a thickness of from 0.1–0.3 mil.

16. A metal base having adhered thereto a baked primer film comprising the heat-reaction product of a mixture of resin components comprising an hydroxyl-containing polyepoxide present in an amount sufficient to supply from 0.03–0.055 mol of hydroxyl radical per 100 parts of total resin solids, said mixture of resins including for each molecular equivalent of hydroxyl radical supplied by said polyepoxide, (1) a polyisocyanate component in an amount to provide from 0.5–1.0 mol of isocyanate radical, (2) a solvent-soluble carboxyl-containing vinyl resin component providing from 0.05–0.07 mol of carboxyl radical, said vinyl resin component containing polymerized therein carboxylic monomer selected from the group consisting of aliphatic, alpha, beta-monoethylenically unsaturated carboxylic acids, anhydrides of said acids and partial alkyl esters of said acids, said carboxylic monomer providing said vinyl resin component with from 0.1–3.0% by weight of free carboxyl radical, and (3) a methyl methacrylate polymer containing at least 75% by weight of polymerized methyl methacrylate with any balance of said polymer being polymerized monovinylidene monomer, said methyl methacrylate polymer being present in an amount to provide a weight ratio of said vinyl resin component to methyl methacrylate polymer of from 0.9:1.0 to 1.6:1.0.

17. A method of prime coating a metal base comprising applying to a surface of said base a film of a mixture of resin components dissolved in an organic solvent, said mixture of resin components comprising an hydroxyl-containing polyepoxide present in an amount sufficient to supply from 0.03–0.055 mol of hydroxyl radical per 100 parts of total resin solids, said mixture of resins including for each molecular equivalent of hydroxyl radical supplied by said polyepoxide, (1) a polyisocyanate component in an amount to provide from 0.5–1.0 mol of isocyanate radical, (2) a solvent-soluble carboxyl-containing vinyl resin component providing from 0.05–0.07 mol of carboxyl radical, said vinyl resin component containing polymerized therein carboxylic monomer selected from the group consisting of aliphatic, alpha, beta-monoethylenically unsaturated carboxylic acids, anhydrides of said acids and partial alkyl esters of said acids, said carboxylic monomer providing said vinyl resin component with from 0.1–3.0% by weight of free carboxyl radical and (3) a methyl methacrylate polymer containing at least 75% by weight of polymerized methyl methacrylate with any balance of said polymer being polymerized monovinylidene monomer, said methyl methacrylate polymer being present in an amount to provide a weight ratio of said vinyl resin component to methyl methacrylate polymer of from 0.9:1.0 to 1.6:1.0, and baking said film at a temperature of at least 300° F. to remove said organic solvent and to cause said resin components to interact with one another.

18. A method of coating a metal base to provide an adherent layer of vinyl resin comprising applying to a surface of said base a film of a mixture of resin components dissolved in an organic solvent, said mixture of resin components comprising an hydroxyl-containing polyepoxide present in an amount sufficient to supply from 0.03–0.055 mol of hydroxyl radical per 100 parts of total resin solids, said mixture of resins including for each molecular equivalent of hydroxyl radical supplied by said polyepoxide, (1) a polyisocyanate component in an amount to provide from 0.5–1.0 mol of isocyanate radical, (2) a solvent-soluble carboxyl-containing vinyl resin component providing from 0.05–0.07 mol of carboxyl radical, said vinyl resin component containing polymerized therein carboxylic monomer selected from the group consisting of aliphatic, alpha, beta-monoethylenically unsaturated carboxylic acids, anhydrides of said acids and partial alkyl esters of said acids, said carboxylic monomer providing said vinyl resin component with from 0.1–3.0% by weight of free carboxyl radical and (3) a methyl methacrylate polymer containing at least 75% by weight of polymerized methyl methacrylate with any balance of said polymer being polymerized monovinylidene monomer, said methyl methacrylate polymer being present in an amount to provide a weight ratio of said vinyl resin component to methyl methacrylate polymer of from 0.9:1.0 to 1.6:1.0, baking said film at a temperature of at least 300° F. to remove said organic solvent and to cause said resin components to interact with one another, applying upon said baked film of primer a topcoat of vinyl resin selected from the group consisting of plastisols and organosols containing polyvinyl chloride, copolymers of vinyl chloride with up to 10% by weight of vinyl acetate and copolymers of vinyl chloride with up to 10% by weight of vinylidene chloride and baking said topcoat to fuse said vinyl resin to said film of baked primer.

References Cited in the file of this patent

UNITED STATES PATENTS

| | | |
|---|---|---|
| 2,687,405 | Rothrock et al. | Aug. 24, 1954 |
| 2,717,216 | Arone | Sept. 6, 1955 |
| 2,829,984 | Yaeger | Apr. 8, 1958 |
| 2,860,074 | Hedlund | Nov. 11, 1958 |
| 2,877,922 | De Cristoforo | Mar. 17, 1959 |
| 2,891,876 | Brown et al. | June 23, 1959 |